United States Patent [19]

Grützmacher et al.

[11] Patent Number: 5,115,738
[45] Date of Patent: May 26, 1992

[54] PRINTING MACHINE PARTICULARLY A SHEET-FED OFFSET PRINTING MACHINE

[75] Inventors: Bertold Grützmacher, Schriesheim; Peter T. Blaser, Dielheim; Michael Krüger, Edingen-Neckarhausen, all of Fed. Rep. of Germany

[73] Assignee: Heidelberger Druckmaschinen AG, Heidelberg, Fed. Rep. of Germany

[21] Appl. No.: 393,597

[22] Filed: Aug. 14, 1989

Related U.S. Application Data

[63] Continuation-in-part of Ser. No. 40,616, Apr. 21, 1987, abandoned.

[30] Foreign Application Priority Data

Apr. 25, 1986 [DE] Fed. Rep. of Germany ....... 3614006

[51] Int. Cl.⁵ .................................................. B41F 5/00
[52] U.S. Cl. ..................................... 101/216; 320/61; 310/67 R; 101/212; 101/348
[58] Field of Search ............. 101/148, 212, 216, 348; 320/61; 310/67 A, 67 R, 68 D

[56] References Cited

U.S. PATENT DOCUMENTS 4,103,194  7/1978  Anderson ......................... 310/68 D
4,360,771  11/1982 Grenlund .............................. 320/61
4,761,577  8/1988  Thomas et al. ................... 310/67 A

FOREIGN PATENT DOCUMENTS 3314454  10/1984  Fed. Rep. of Germany.
1555735  12/1968  France.
2314614  1/1977   France.

Primary Examiner—Edgar S. Burr
Assistant Examiner—Christopher A. Bennett
Attorney, Agent, or Firm—Herbert L. Lerner; Laurence A. Greenberg

[57] ABSTRACT

Printing machine with at least one printing unit having rotating cylinders, comprising an energy converter disposed at least partially in one of the cylinders for converting at least some rotational energy of the cylinder into electrical energy and an energy storage device also disposed in the cylinder for storing the electrical energy.

4 Claims, 7 Drawing Sheets

PRINTING MACHINE PARTICULARLY A SHEET-FED OFFSET PRINTING MACHINE

This application is a continuation-in-part of application Ser. No. 040,616, filed Apr. 21, 1987, and now abandoned.

The invention relates to a printing machine and, more particularly, to a sheet-fed offset printing machine, with at least one printing unit having rotating cylinders.

Printing machines usually have a multiplicity of cylinders which have various tasks to perform. Thus, for example, several transfer cylinders are required for paper conveying; furthermore, one cylinder is provided with the printing plate, two other cylinders are required as impression and blanket cylinders for printing the paper. Some of these cylinders have elements inside them which perform movements during the printing process or during the setting or adjustment of the printing machine. Thus, for example, German Patent (DE-PS) 29 46 252 discloses a device on a plate cylinder of a printing machine with which the diameter of the plate cylinder can be changed. In this case, changing the diameter causes the printing plate on the plate cylinder to stretch. To produce such a change in diameter, this German patent proposes that a pressure medium be fed in through the shaft of the cylinder and that the cylinder walls be subjected to this pressure medium.

Also known heretofore are devices, such as sheet grippers, in which the movement of elements in the cylinder are controlled by means of fixed cam sections. It has been found, however, that in many cases, motion within the cylinder by means of electric servo-drives is desirable. Slip rings and wipers, or sliding contacts, for example, have become known heretofore for transmitting the electrical energy required for such servo-drives but they have the disadvantage that, due to fouling with dirt, they change their contact resistance; furthermore, they require a relatively large installation space and are subject to a high rate of wear. A further possibility for supplying energy lies in the use of a ring type transformer, however, such a transformer would likewise require a great amount of space.

It is accordingly an object of the invention, to provide a printing machine of the foregoing general type which avoids the aforementioned disadvantages of conventional constructions.

With the foregoing and other objects in view, there is provided, in accordance with the invention, a printing machine with at least one printing unit having rotating cylinders, comprising an energy converter disposed at least partially in one of the cylinders for converting at least some rotational energy of the one cylinder into electrical energy, and an energy storage device also disposed in the one cylinder for storing said electrical energy.

The advantage of the invention lies in the fact that it is not necessary to supply any additional energy to the cylinder, but the electrical energy can be obtained from the rotational energy of the cylinder and is stored in order to provide the electrical energy even while the cylinder is stopped. The energy may be stored both by electrochemical means, i.e. by means of an accumulator, and by electrostatic means with a capacitor. The capacitance of the capacitor may also be such that there is simply a smoothing of the voltage produced. Although the German Published Non-Prosecuted Application (DE-OS) 35 17 179 discloses a device for sheet monitoring with a transmitter disposed on the cylinder and with a fixed receiver, the transmitter generating a brief light pulse due to the rotary motion of the cylinder when the cylinder is in a given position, this device is concerned only with a signal-transmission facility which converts a voltage pulse into a light pulse in order to monitor or control the position of the sheet.

In accordance with one embodiment of the invention, it is proposed that a stator part of the energy converter be rigidly disposed on a rotating cylinder or inside the rotating cylinder and that a so-called active or operative element be movably mounted in the cylinder so that a voltage is induced in the stator part, the motion of the active or operative element being produced, for example, by a lever which, as the cylinder turns, is brought past a fixed part of the printing machine and then performs a swiveling movement. In principle, therefore, this embodiment makes use of the mechanical reaction torque which is produced by the relative motion between the cylinder and the fixed parts of the printing machine.

In a another embodiment of the invention, there is proposed, instead of this mechanical reaction torque, to use a force-of-gravity torque to produce relative motion between the stator part and an active or operative element exposed to the action of the force of gravity. This is accomplished, for example, by mounting a conventional rotationally symmetrical generator in the impression cylinder, and providing a weight on the shaft of the rotor which shifts the center of gravity of the rotor. As the cylinder rotates, the rotor remains in its rest position and produces an induced voltage due to the relative motion between the rotor and the stator.

According to a further embodiment of the invention, such a generator may also make use of the afore-mentioned reaction torque instead of utilizing the force of gravity. For this purpose, the rotor shaft of the generator is provided with a pinion which is in engagement with a toothed gear mounted on the printing machine and which rolls on the toothed gear as the cylinder rotates.

In an especially simple embodiment of the invention it is proposed that a coil be provided on or in the cylinder and that the active or operative element be in the form of a pushrod, which performs a tilting or linear motion and which is moved above the coil, in conjunction with a permanent magnet mounted on the pushrod or between the pushrod and the coil so as to induce a voltage in the coil. The tilting or linear motion of the pushrod is produced in this connection by a cam plate which is attached to a fixed part of the printing machine.

Other features which are considered as characteristic for the invention are set forth in the appended claims.

Although the invention is illustrated and described herein as embodied in a printing machine, particularly a sheet-fed offset printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like components are identified by the same reference numerals in the figures.

Figure 1:
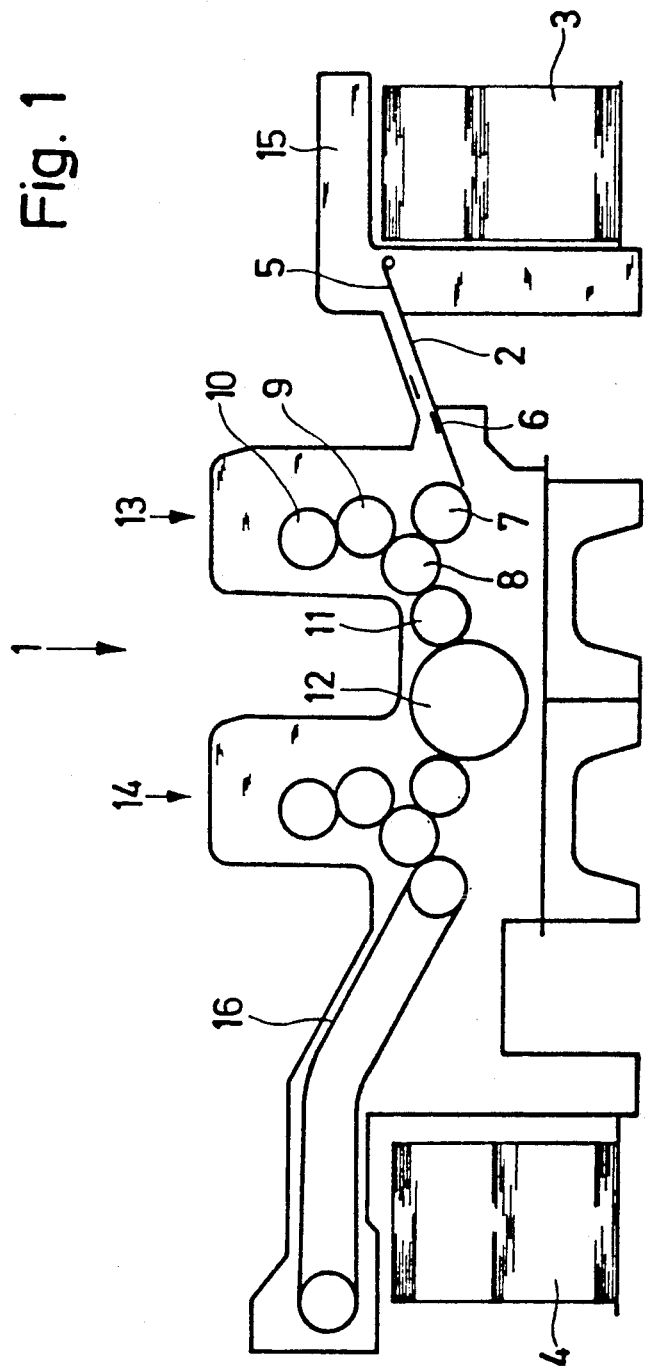
FIG. 1 is a diagrammatic side elevational view of a sheet-fed printing machine with two printing units showing its basic construction.

Referring now to the drawing and first, particularly, to FIG. 1 thereof, there is shown a sheet-fed printing machine in which sheets 6 to be printed are supplied from a sheet feeder 15 via a feed table 2 to a feed drum 7 of a first printing unit 13. The printing unit 13 has a plate cylinder 10, a rubber-covered or blanket cylinder 9 and an impression cylinder 8. After each sheet 6 has received its first printed impression, it is passed on via a transfer cylinder 11 and a storage drum 12 to a the next printing unit 14. This unit 14 is of the same construction as that of the printing unit 13. After the sheet 6 has passed through this printing unit 14, it is fed via a delivery system 16 to a delivery pile 4.

Hereinafter, with reference to some embodiments, several possibilities are described for providing electrical energy within one or more of these rotating cylinders.

Figure 2:
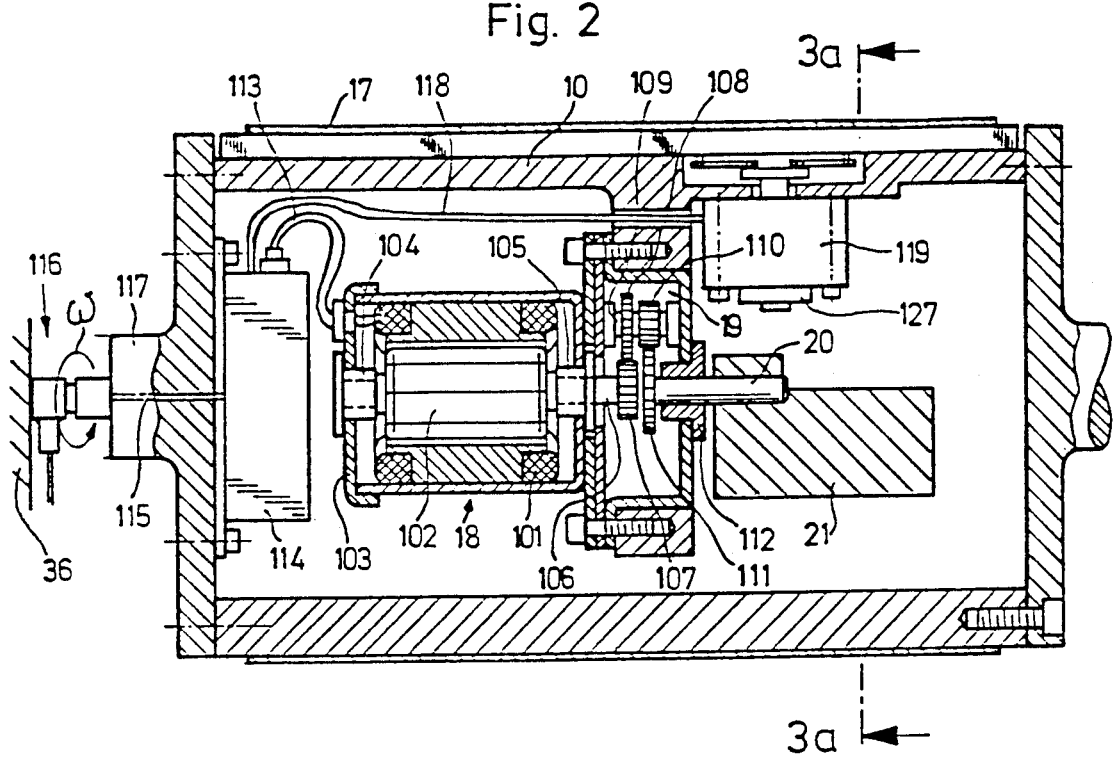
FIG. 2 is a longitudinal sectional view of an energy converter in a plate cylinder.

FIG. 2 shows a plate cylinder 10 containing a generator 18. The generator 18 has windings or coils 101 disposed about the periphery at the stator side thereof. The generator 18 has a rotor 102 which is mounted at the ends thereof via bearing bushings 104 and 105 on a housing 103 of the generator 18. A first gear 107 of a step-up gear unit or transmission 19 connected forward of the generator 18 is secured on a shaft 106 of the rotor 102 and meshes with a gear 108 of the transmission 19 which is securely mounted on an intermediate shaft 109. The intermediate shaft 109 is rotatably mounted in a housing of the transmission 19 and carries another gear 110. The gear 110 meshes with a gear 111 which is securely mounted on an input shaft 20 of the transmission 19. The input shaft 20 is rotatably mounted in a bearing bushing 112 of the transmission 19. A weight 21 is eccentrically attached to the input shaft 20. When the plate cylinder 10 is set into rotation during operation of the printing press, the weight 21, by remaining in its stable equilibrium position owing to the force of gravity, produces a rotational movement of the rotor 102 having a rate which, in accordance with the respective transmission ratio, corresponds to a multiple of the rate of rotation of the plate cylinder 10.

Of course, it is also possible to drive the generator 18 without the intermediary of the gear unit or transmission 19. The use and also the dimensioning of the gear unit 19 is dependent on the rotational speed of the plate cylinder 10 and on the required output voltage of the generator 18. The electrical energy produced by the generator 18 is supplied directly or via a conventional rectifier circuit to an accumulator 58.

The rotor 102 is equipped with permanent magnets generating a magnetic field which induces an electric voltage in the windings or coils 101. The electric voltage is fed via a line 113 to an electrical device 114 which is controlled via a control cable 115 from the outside i.e. from a fixed location on the printing machine. The control cable 115 is advantageously an optical guide such as a fiber-optics line which extends through a rotary pass-through 116. The rotary pass-through 116 has a fixed part by which it is fastened to the side wall 36 of a printing machine, and a rotatable part by which it is fastened to a journal pin 117 of the plate cylinder 10. The electrical energy made available within the electrical device 114 is fed via a conducting cable or feeder 118 to an adjusting motor or servomotor 119. This adjusting motor 119 serves for shifting pairs of plate clamping rails.

Figure 3A:
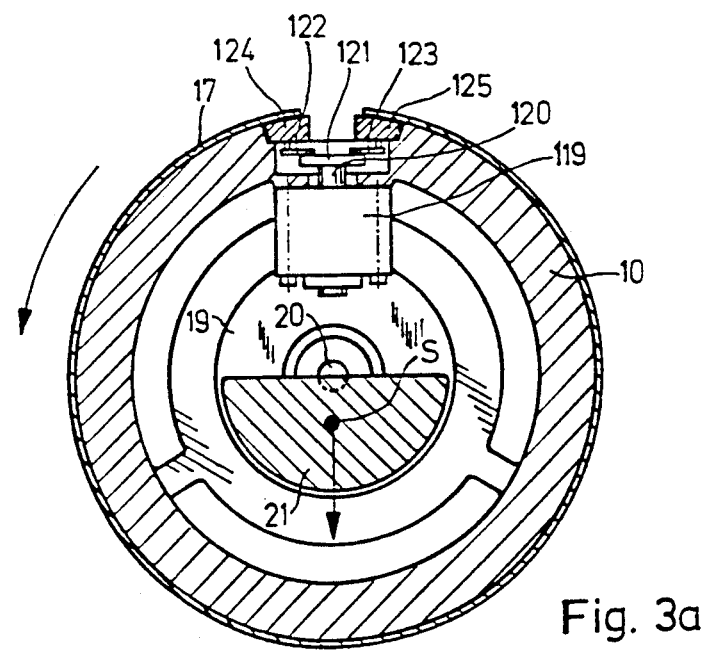
FIG. 3a is a cross-sectional view of FIG. 2 taken along the line 3a—3a in the direction of the arrows.
Figure 3B:
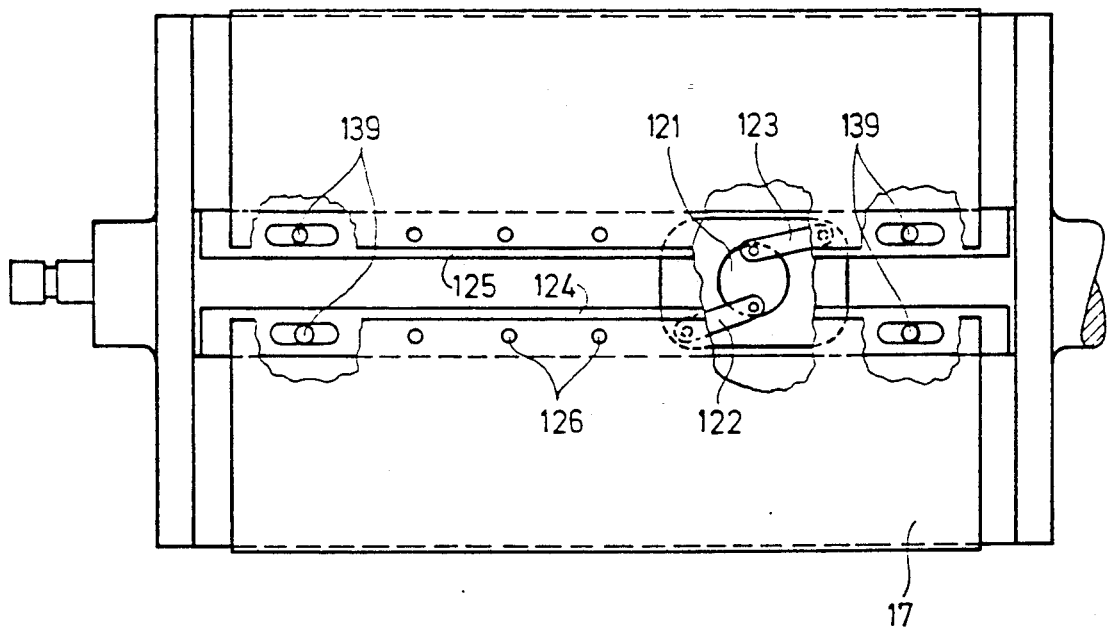
FIG. 3b is a side elevational view of the energy converter.

FIGS. 3a and 3b illustrate in greater detail the mechanical means for adjusting the clamp rails, and are described hereinafter. It is apparent from FIG. 3a that the center of gravity "S" of the weight 21 is eccentric with respect to the input shaft 20 of the gear unit 19. It also becomes apparent from this arrangement that, if the center of gravity is low, even relatively high accelerations do not markedly influence the center-of-gravity position of the weight 21. Furthermore, of course, it is possible to adapt or match the load connected to the generator 18 to the maximum producible torque of the weight 21 under acceleration and at maximum rotational speed. For example, by means of an electric feedback control or by adjusting the ratio in the gear unit 19, it is possible to vary the relationship between the input torque and the output torque required by the electric load.

The adjusting motor 119, as shown in FIG. 3a, carries a fastening disc 121 on an output shaft 120 thereof. Two rails 122 and 123 are fastened by one end thereof, respectively, to the fastening disc 121. The other end, respectively, of the rails 122 and 123 engages, via respective pins, with the underside of printing-plate clamping rails 124 and 125. The printing plate 17 is fastened at both ends thereof, via fastening elements 126, to the printing-plate clamping rails 124 and 125, which are capable of being shifted in axial direction. Guide pins 139, which engage in slots formed in the printing-plate clamping rails 124 and 125, are provided for guiding the printing plate clamping rails 124 and 125. These movements serve to dispose the plate 17 at an inclination to the surface of the printing-plate cylinder 10 in order to correct a possibly inclined printed image. Naturally, the adjustment path or travel is very short, the motor 119 therefore executing a movement of only a few angular degrees. To restore the attitude of the rotor position of the motor 119, a location transmitter 127 is provided on the motor 119 and may be formed, for example, of an inductively operating sensor which emits an output signal which is fed via the conducting cable 118 to the electrical device 114.

Figure 3C:
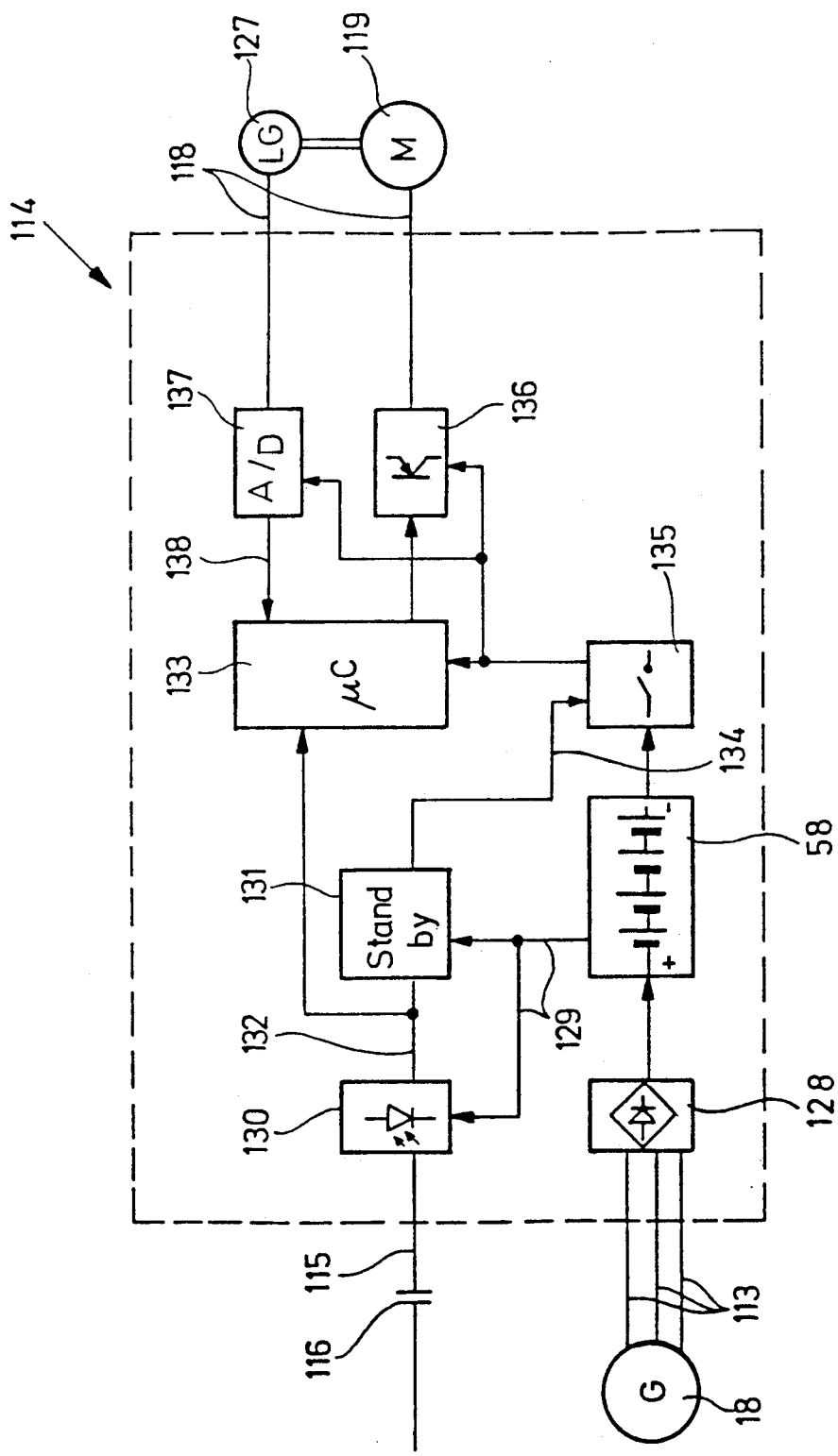
FIG. 3c is a block circuit diagram of a device forming part of the energy converter of FIG. 2.

According to FIG. 3c, the electrical device 114 contains an accumulator 58 which stores electrical energy generated by the generator 18. A rectifier and load circuit 128 is connected to an input of the accumulator 58 and converts the alternating voltage generated by the generator into a load voltage. The accumulator voltage is fed via a line 129 to a signal receiver 130 and a stand-by circuit 131 for electrically supplying these components.

The control signal which, as aforementioned, is an optical signal, is fed via the control cable 115 to the electrical device 114, is converted in the signal receiver 130 into an electrical signal, and transmitted via a line 132 both to the stand-by circuit as well as to a microprocessor 133. The stand-by circuit 131, upon receiving such a signal, activates the entire control system and serves thereby for saving energy i.e. when no control signal is applied, the control system is in a no-current condition. The output signal of the stand-by circuit 131 is fed via a line 134 to an activating switch 135 which switches the voltage of the accumulator 58 to the microprocessor in a conventional manner. The microprocessor 133 also serves for decoding the control signal which is fed thereto via the line or control cable 115 of the electrical device 114.

The microprocessor 133, accordingly, only performs the function of effecting the decoding of a signal and of enabling the control of a motor due to this signal. These relatively simple functions are well known to any person of ordinary skill in the Art and need not be explained in any further detail. The output signal formed by the final output stage 136 controls the motor 119 via the conducting cable or line 118. By means of the location transmitter 127, the motor position is determined and switched into an analog-to-digital (A/D) converter 137 via the conducting cable 118. A digital output signal from the A/D converter 137 is fed to the microprocessor 133 via a line 138. The motor 119 is thereby controlled by a nominal value-actual value comparison with respect to the position thereof.

Figure 4:
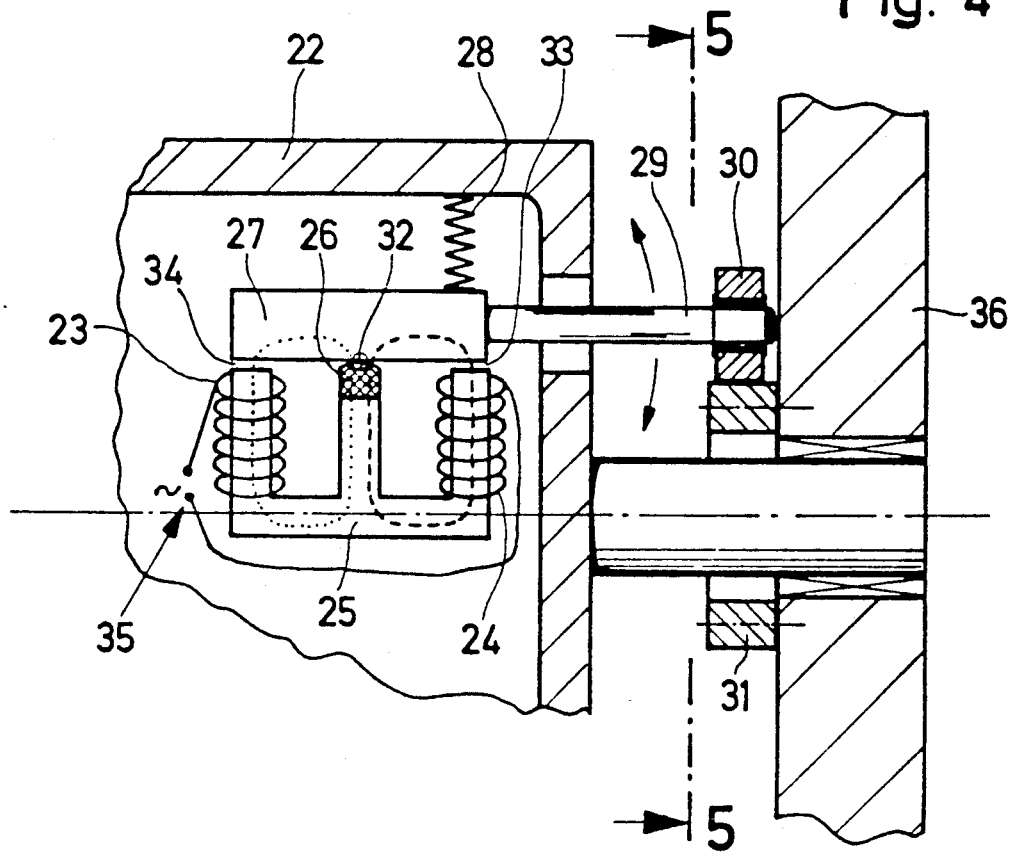
FIG. 4 is a diagrammatic sectional view of another energy converter.
Figure 5:
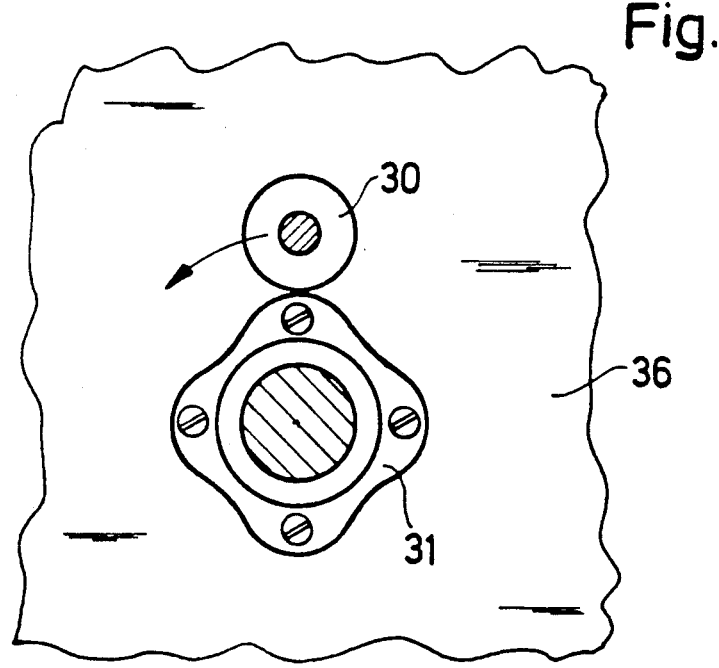
FIG. 5 is a sectional view of FIG. 4 taken along the line 5—5 in the direction of the arrows and showing an arrangement for cyclical generation of motion.

FIG. 4 shows a diagrammatic construction of another energy converter. This energy converter, too, is located inside a cylinder 22, in which electrical energy is required. The energy converter is formed of two coils 23 and 24 which are connected in series. The coils 23 and 24 are mounted on the outer legs of a stator 25 in the form of an E-core. The middle leg bears a permanent magnet 26 with a vertical magnetization direction. A return yoke 27 is so disposed on the E-core as to be able to perform a tilting motion about a pivot point 32. This tilting motion is produced via a lever arm 29 and a roller 30 by a fixed cam plate 31 disposed outside the rotating cylinder 22. This cam plate 31 is located, for example, on a frame 36 of the printing machine and, as shown in the sectional view of FIG. 5 (section 5—5), is of such construction that the return yoke 27 performs four tilting motions during one revolution of the cylinder 22. The cam plate 31 is disposed concentrically to or coaxially with the rotational axis of the cylinder 22, as is clearly shown in FIG. 4.

If the return yoke 27 performs a tilting motion in a clockwise direction, as viewed in FIG. 4, there is an increase in the magnetic flux (represented by dashes) in the leg of the stator 25 on which the coil 24 is disposed, because the width of the air gap 33 decreases, while the magnetic flux (represented by dots) in the leg on which the coil 23 is disposed is reduced as result of the increase in the width of the air gap 34. A tilting motion of the return yoke 27 in a counterclockwise direction changes the air gaps in the opposite direction, so that, in such a case, the magnetic flux increases in the coil 23 and decreases in the coil 24. Thus, a voltage is alternatingly induced in the coils and can be picked off at terminals 35 in the form of an a.c. voltage.

Figure 6:
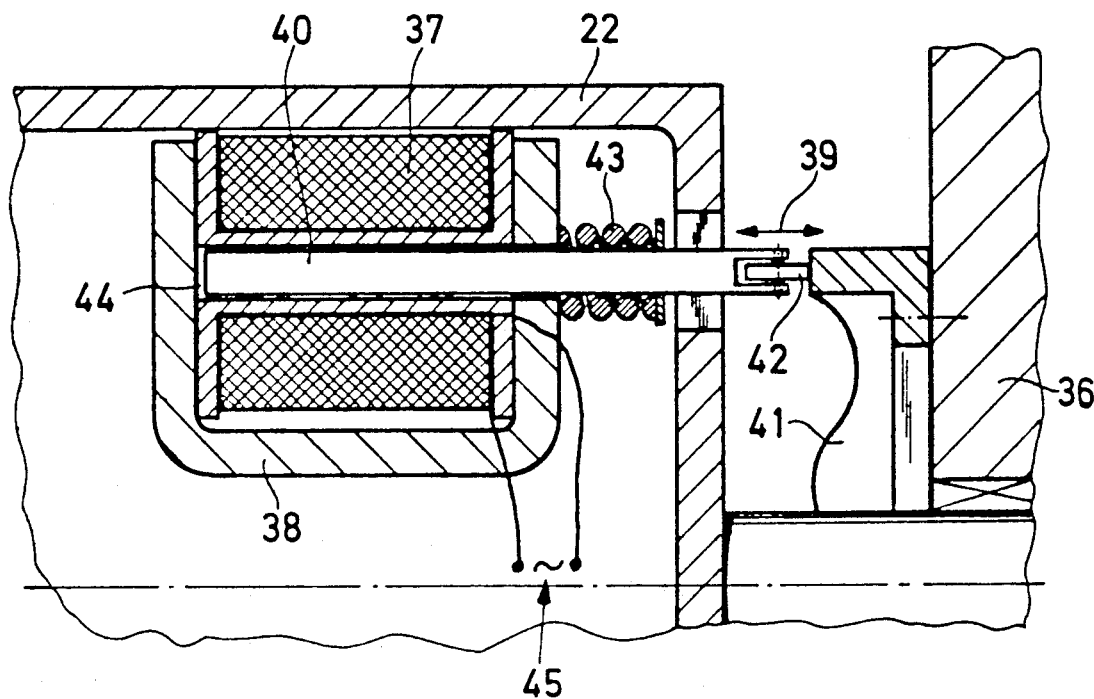
FIG. 6 is a diagrammatic sectional view of a third and linearly driven energy converter.

FIG. 6 is a sectional view of a linearly driven energy converter. This energy converter is likewise disposed inside a cylinder 22 and is formed of a coil, an iron yoke and a permanent-magnet pushrod 40 which is subjected to a linear direction of motion represented by a double headed arrow 39.

The linear motion of the pushrod 40 is effected by an axially directed cam plate 41 which is mounted on the side wall 36, and a roller 42 which is mounted on the end of the pushrod and rolls on the cam plate 41 as the cylinder 22 rotates. The roller 42 is pressed against the cam plate 41 by a compression spring 43 which is braced against an iron yoke 38. In this case, too, the cam plate may be of such construction that several motions of the pushrod are produced during one revolution of the cylinder. The air gap 44 is changed cyclically by these motion of the pushrod. The thus produced change of flux within the magnetic circuit induces a voltage in a coil 37, and this voltage can be picked off at terminals 45.

Figure 7:
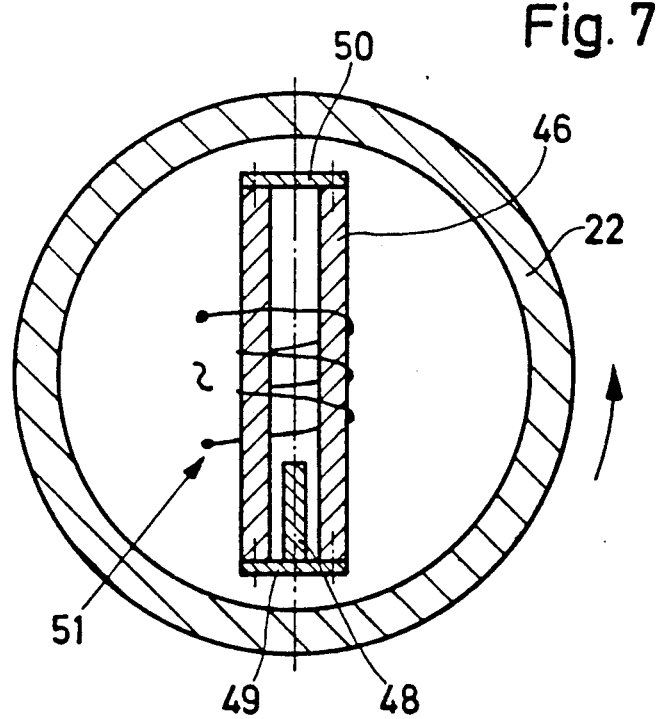
FIG. 7 is a sectional view of a fourth energy converter, one which uses linear motion.

FIG. 7 shows an energy converter which, similarly to the one shown in FIG. 2, makes use of the force of gravity. Situated inside the diagrammatically indicated cylinder 22 is a sleeve 46 which is disposed radially in the cylinder and between which there is an elongated permanent-magnet body 48. The sleeve 46 is rigidly connected to the cylinder 22. As the cylinder 22 rotates about its axis, the permanent-magnet body 48 moves back and forth longitudinally within the sleeve 46 between two stops 49 and 50 due to the force of gravity and induces an a.c. voltage in the coil 51. The magnet body 48 is magnetized in the longitudinal direction. The motion of the magnet body 48 can be damped at the stops 49 and 50. This so-called linear generator may also be constructed of several coils and/or a commutating device. In this connection, the task of the commutating device is to switch the voltage produced by the magnetically excited coils with respect to sensor signals. The sensor signals can be produced by position sensors which detect the position of the magnetic body.

If required, a rectifier either integrated into the commutating device or post connected thereto forms a d.c. voltage from the induced voltage.

Of course, as shown in FIGS. 4 to 7, it is also possible to have a reversed arrangement of the coil system and operative element i.e. in this case the coil is movable with respect to the cylinder and the operative element is fixed to the cylinder, with the electrical energy produced by the coil being transmitted via flexible lines to the other electrical components, such as, accumulators, for example.

Figure 8:
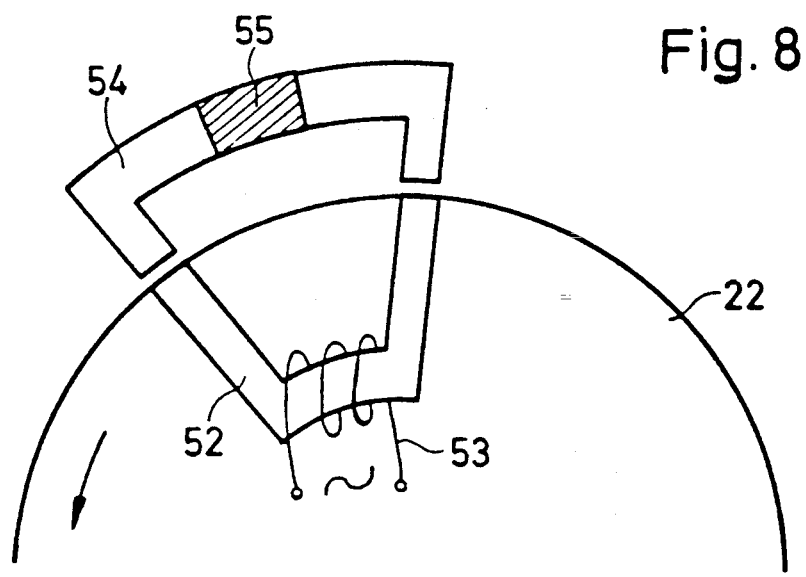
FIG. 8 is a diagrammatic view of a fifth and non-contacting energy converter.

FIG. 8 shows a further embodiment of an energy converter. A coil 53 is wound around a U-core 52 on or inside the rotating cylinder 22. Outside the cylinder 22 and stationary with respect to the cylinder 22 there is so disposed a return yoke 54 with a permanent magnet 55 that, while the cylinder rotates, there is a variable magnetic flux in the magnetic circuit formed by the two elements, namely the U-core 52 and the return yoke 54. This variable magnetic flux induces a voltage in the coil 53, and it is possible, for example, with one or more fixed magnet arrangements, namely the return yoke 54 and permanent magnet 55, to produce a voltage in the coil 53. An advantage of this arrangement is that there are no frictional forces of any kind between the rotating cylinder and the stationary housing of the printing machine.

Figure 9:
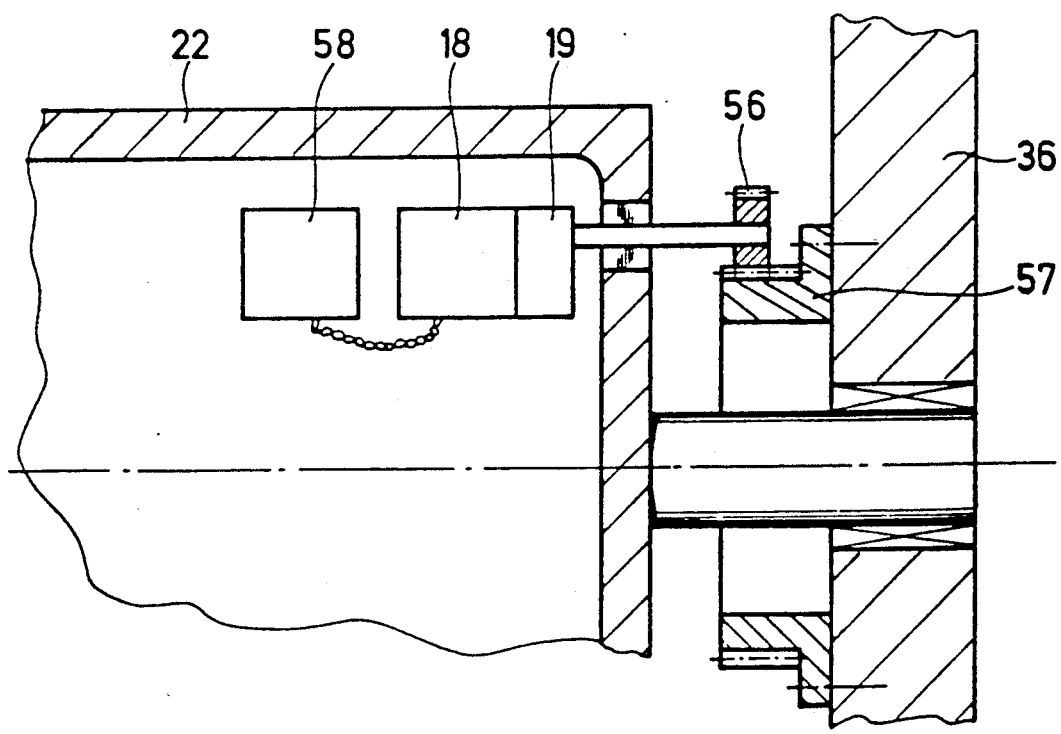
FIG. 9 is a diagrammatic sectional view of a rotating electric generator.

FIG. 9 shows a further type of drive for a generator 18. This generator 18 is located inside the cylinder 22 with a step-up gear or transmission unit 19 connected forward thereof; the input shaft of the gear unit 19 carries a pinion 56 which is in meshing engagement with a ring gear 57. The ring gear 57 is, respectively, rigidly mounted on the side wall 36 of the printing machine and axially displaceable for engaging with and disengaging from the pinion 56. This arrangement is a particularly simple means for effecting energy conversion. The electrical energy produced by the generator is supplied via suitable connecting lines to an accumulator 58.

From the figures, the energy conversion is clear in each case; the electrical energy formed is supplied either directly or via a rectifier or commutating device to an accumulator 58 or to a capacitor which is charged with the energy during the rotation of the cylinder and which, during the printing or while the printing machine is inoperative, provides electrical energy for servo-elements driven by electric motors and disposed in the cylinder.

Of course, it is also possible for more than one generator to be arranged in a cylinder; it is also possible, moreover, to link generators of different operating principles within the same cylinder so that, for example, a first generator is effective within a given rotational-speed range whereas, in another rotational-speed range, another generator can be switched in or can be driven alternatively to the first generator. Thus, for example, it is possible, at low printing-machine speeds, for a generator according to FIG. 2 with a step-up gear or transmission unit to be used, this generator thus supplying an adequate voltage at such speeds whereas, at higher speeds, for example, a generator according to FIG. 6 is used. The generators according to FIGS. 4 to 6 may, for example, be switched on and off by the movement of the respective cam plate 31, 41. Furthermore, the rate of change of the induced voltage with respect to time can be selected by appropriate construction of the cam plate.

We claim:

1. Printing machine with at least one printing unit having rotating cylinders, comprising an energy converter disposed at least partially in one of the cylinder for converting at least some rotational energy of the one cylinder into electrical energy, and an energy storage device also disposed in the one cylinder for storing said electrical energy, said energy converter being an electric generator having a stator and a rotor with an input shaft disposed coaxially with said stator, and an eccentrically disposed weighted mounted on said input shaft, said weight tending to remain in rest position so that relative motion occurs between the rotor and the stator of said generator when the one cylinder rotates, and including a step-up gear unit is connected to said electric generator.

2. Printing machine according to claim 1, wherein said the energy-storage device is an accumulator operating in accordance with electrochemical principles.

3. Printing machine according to claim 1, wherein said energy-storage device is a capacitor 4. Printing machine according to claim 1, wherein said step-up gear unit is connected to said electric generator at a forward location thereof.

* * * * *